United States Patent
Lian et al.

(10) Patent No.: US 11,907,121 B2
(45) Date of Patent: Feb. 20, 2024

(54) METHODS FOR CACHING AND READING CONTENT, CLIENT, AND STORAGE MEDIUM

(71) Applicant: BEIJING BYTEDANCE NETWORK TECHNOLOGY CO., LTD., Beijing (CN)

(72) Inventors: Weiqin Lian, Beijing (CN); You Tu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 67 days.

(21) Appl. No.: 17/764,516

(22) PCT Filed: Aug. 14, 2020

(86) PCT No.: PCT/CN2020/109198
§ 371 (c)(1),
(2) Date: Mar. 28, 2022

(87) PCT Pub. No.: WO2021/057325
PCT Pub. Date: Apr. 1, 2021

(65) Prior Publication Data
US 2022/0350740 A1    Nov. 3, 2022

(30) Foreign Application Priority Data
Sep. 26, 2019   (CN) .......................... 201910919461.1

(51) Int. Cl.
*G06F 12/0802*     (2016.01)
*G06F 16/78*       (2019.01)
(52) U.S. Cl.
CPC .......... *G06F 12/0802* (2013.01); *G06F 16/78* (2019.01); *G06F 2212/60* (2013.01)

(58) Field of Classification Search
CPC .. G06F 12/0802; G06F 16/78; G06F 2212/60; G06F 16/9574; G06F 16/2282;
(Continued)

(56) References Cited

U.S. PATENT DOCUMENTS 10,318,417 B2   6/2019   Lu et al.
11,120,038 B1*  9/2021   Ossher ................. G06F 16/211
(Continued)

FOREIGN PATENT DOCUMENTS

CN   101350030 A   1/2009
CN   101656094 A   2/2010
(Continued)

OTHER PUBLICATIONS

International Patent Application No. PCT/CN2020/109198; Int'l Written Opinion and Search Report; dated Oct. 28, 2020; 5 pages.

*Primary Examiner* — Zhuo H Li
(74) *Attorney, Agent, or Firm* — BakerHostetler

(57) ABSTRACT

A method for caching content, a method for reading content, a client, and a storage medium are provided. The method for caching content includes: acquiring JSON data corresponding to content to be delivered, and determining identification information corresponding to the JSON data; grouping the JSON data and storing the grouped JSON data according to the identification information to obtain a memory list corresponding to the identification information, and writing the JSON data to a target disk according to the identification information and the memory list; performing video preloading processing on the content to be delivered according to the JSON data to obtain preloaded video data, and determining address information corresponding to the preloaded video data; and storing the address information in the
(Continued)

memory list and the target disk according to the identification information, to complete caching of the JSON data and the preloaded video data.

9 Claims, 6 Drawing Sheets

(58) Field of Classification Search
CPC ... G06F 16/258; H04L 12/00; H04N 21/2668; H04N 21/4331; H04N 21/4312; H04N 21/4335; H04N 21/443; H04N 21/4586; H04N 21/812

See application file for complete search history.

(56) References Cited

U.S. PATENT DOCUMENTS

| | | | | |
|---|---|---|---|---|
| 11,475,092 | B2 * | 10/2022 | Lutz | .................... H04L 67/5682 |
| 2013/0326189 | A1 | 12/2013 | Cilibrasi et al. | |
| 2018/0167319 | A1 | 6/2018 | Qian et al. | |
| 2021/0117611 | A1 * | 4/2021 | Liu | ..................... H03M 7/4031 |
| 2022/0224978 | A1 * | 7/2022 | Lian | ..................... H04N 21/812 |

FOREIGN PATENT DOCUMENTS

| | | |
|---|---|---|
| CN | 102750174 A | 10/2012 |
| CN | 102968299 A | 3/2013 |
| CN | 103440276 A | 12/2013 |
| CN | 104407990 A | 3/2015 |
| CN | 104615432 A | 5/2015 |
| CN | 104699422 A | 6/2015 |
| CN | 105608142 A | 5/2016 |
| CN | 105869005 A | 8/2016 |
| CN | 106294352 A | 1/2017 |
| CN | 106708443 A | 5/2017 |
| CN | 106777266 A | 5/2017 |
| CN | 107621969 A | 1/2018 |
| CN | 109426631 A | 3/2019 |
| CN | 109543080 A | 3/2019 |
| CN | 109558386 A | 4/2019 |
| CN | 109597568 A | 4/2019 |

* cited by examiner

METHODS FOR CACHING AND READING CONTENT, CLIENT, AND STORAGE MEDIUM

CROSS REFERENCE OF RELATED APPLICATION

The present application is a national phase application of PCT international patent application PCT/CN2020/109198, filed on Aug. 14, 2020, which claims priority to Chinese Patent Application No. 201910919461.1, titled "METHODS FOR CACHING AND READING CONTENT, CLIENT, AND STORAGE MEDIUM", filed on Sep. 26, 2019, with the China National Intellectual Property Administration, both of which are incorporated herein by reference in their entireties.

FIELD

Embodiments of the present disclosure relate to a native splash advertisement delivery technology in the field of application programs, and in particular to a method for caching content, a method for reading content, a client, and a storage medium.

BACKGROUND

With the development of smart hardware and mobile Internet technology, terminals, such as smart phones, tablet computers and smart watches, become increasingly popular in work and daily life. Information are increasingly acquired through client applications on terminals. Correspondingly, there is an increasing trend for advertisers to place a splash advertisement on these client applications. The splash advertisement is displayed directly when the client application is opened. This display manner of splash advertisements plays a good role in advertising, is one of the most popular advertising forms by advertisers, and is also a commonly used commercial monetization way for client applications.

However, with the increase in the number of times for starting a client application and the increase in the amount of splash advertisements, the client has to preload increasing data of the splash advertisements, resulting in reduction in a speed for starting the client and a delay in reading of native splash advertisements, and thereby fluency of native splash advertisements is reduced.

SUMMARY

In view of this, a method for caching content, a method for reading content, a client, and a storage medium are provided according to embodiments of the present disclosure.

In a first aspect, a method for caching content is provided according to an embodiment of the present disclosure. The method includes: acquiring JS object notation JSON data corresponding to content to be delivered, and determining identification information corresponding to the JSON data; grouping the JSON data and storing the grouped JSON data according to the identification information to obtain a memory list corresponding to the identification information, and writing the JSON data to a target disk according to the identification information and the memory list; performing video preloading processing on the content to be delivered according to the JSON data to obtain preloaded video data, and determining address information corresponding to the preloaded video data, where the preloaded video data is for partially caching video data for the content to be delivered; and storing the address information in the memory list and the target disk according to the identification information, to complete caching of the JSON data and the preloaded video data.

In the above solutions, the grouping the JSON data and storing the grouped JSON data according to the identification information to obtain a memory list includes: storing the JSON data with same identification information in a same list, and generating the memory list corresponding to the identification information, where the identification information is in one-to-one correspondence with the memory list.

In the above solutions, the performing video preloading processing on the content to be delivered according to the JSON data to obtain preloaded video data includes: preloading, based on the JSON data, part of all video data corresponding to the content to be delivered according to a preset data parameter, to obtain the preloaded video data.

In the above solutions, after the storing the address information in the memory list and the target disk according to the identification information, the method further includes: traversing the memory list, and performing the video preloading process on the JSON data in the memory list that does not store the address information, to obtain all the video data corresponding to the content to be delivered.

In the above solutions, after the storing the address information in the memory list and the target disk according to the identification information, the method further includes: traversing the memory list and deleting expired data in the memory list to obtain an updated memory list; and updating the target disk according to the updated memory list.

In a second aspect, a method of reading content is provided according to embodiment of the present disclosure. The method includes: determining identification information of JSON data corresponding to content to be delivered, when receiving a starting instruction; reading address information from a memory list corresponding to the identification information and reading preloaded video data according to the address information if the address information corresponding to the preloaded video data is in the memory list, where the preloaded video data is for partially reading the content to be delivered; and reading address information from a target disk and reading preloaded video data according to the address information if there is no address information corresponding to preloaded video data in a memory list corresponding to the identification information.

In the above solutions, after the reading address information from a target disk and reading preloaded video data according to the address information, the method further includes: updating the memory list according to the identification information and the address information.

In the above solutions, after the determining identification information of JSON data corresponding to content to be delivered, the method further includes: detecting a current state parameter; and determining to read the preloaded video data if the current state parameter meets a preset display condition, where the preset display condition is for determining whether to display a splash advertisement video corresponding to the preloaded video data.

In the above solutions, after the reading preloaded video data according to the address information, the method further includes: embedding the preloaded video data into a current information stream to obtain the information stream to be displayed; and playing a target video corresponding to the information stream to be displayed in response to the starting instruction.

In the above solutions, after the reading preloaded video data according to the address information, the method further includes: performing structure conversion processing on the JSON data to obtain converted JSON data; and embedding the converted JSON data into a current information stream.

In the above solutions, before the playing a target video corresponding to the information stream to be displayed, the method further includes: acquiring a pre-stored simulation starting image and/or pre-stored simulation starting video after receiving the starting instruction; and displaying the pre-stored simulation starting image and/or pre-stored simulation starting video in response to the start-up instruction.

In a third aspect, a first client is provided according to an embodiment of the present disclosure. The first client includes an acquiring unit, a first determining unit, a writing unit and a storage unit. The acquiring unit is configured to acquire JSON data corresponding to content to be delivered. The first determining unit is configured to determine identification information corresponding to the JSON data. The acquiring unit is further configured to group the JSON data and store the grouped JSON data according to the identification information, to obtain a memory list corresponding to the identification information. The writing unit is configured to write the JSON data to a target disk according to the identification information and the memory list. The acquiring unit is further configured to perform video preloading processing on the content to be delivered according to the JSON data to obtain preloaded video data, where the preloaded video data is for partially caching the video data for the content to be delivered. The first determining unit is further configured to determine address information corresponding to the preloaded video data. The storage unit is configured to store the address information in the memory list and the target disk according to the identification information, to complete caching of the JSON data and the preloaded video data.

In the above solutions, the acquiring unit is configured to store the JSON data with same identification information in a same list, and generate the memory list corresponding to the identification information, where the identification information is in one-to-one correspondence with the memory list. The acquiring unit is further configured to preload, based on the JSON data and according to a preset data parameter, part of all video data corresponding to the content to be delivered to obtain the preloaded video data.

In the above solutions, the first client further includes a first updating unit. The acquiring unit is further configured to traverse the memory list after the address information is stored in the memory list and the target disk according to the identification information, and perform the video preloading process on JSON data in the memory list that does not store the address information, to obtain all video data corresponding to the content to be delivered. The first updating unit is configured to: after the address information is stored in the memory list and the target disk according to the identification information, traverse the memory list and delete expired data in the memory list to obtain an updated memory list; and update the target disk according to the updated memory list.

In a fourth aspect, a second client is provided according to an embodiment of the present disclosure. The second client includes a second determining unit and a reading unit. The second determining unit is configured to determine identification information of JSON data corresponding to content to be delivered after a starting instruction is received. The reading unit is configured to: if address information corresponding to preloaded video data exists in a memory list corresponding to the identification information, read the address information from the memory list, and read the preloaded video data according to the address information, where the preloaded video data is used for partially reading the content to be delivered. The reading unit is further configured to, if address information corresponding to preloaded video data does not exist in a memory list corresponding to the identification information, read the address information from a target disk, and read the preloaded video data according to the address information.

In the above solutions, the second client further includes a second updating unit, a detecting unit and a determining unit. The second updating unit is configured to read the address information from the target disk, and update the memory list according to the identification information and the address information after the preloaded video data is read according to the address information. The detecting unit is configured to detect a current state parameter after the identification information of the JSON data corresponding to the content to be delivered is determined. The determining unit is configured to determine to read the preloaded video data if the current state parameter meets a preset display condition, where the preset display condition is for determining whether to display a splash advertisement video corresponding to the preloaded video data.

In the above solutions, the second client further includes an embedding unit, a playing unit and a converting unit. The embedding unit is configured to embed the preloaded video data into a current information stream after the preloaded video data is read according to the address information, to obtain an information stream to be displayed. The playing unit is configured to play a target video corresponding to the information stream to be displayed in response to the starting instruction. The converting unit is configured to perform structure conversion processing on the JSON data after the preloaded video data is read according to the address information, to obtain the converted JSON data. The embedding unit is further configured to embed the converted JSON data into the current information stream.

In a fifth aspect, a first client is provided according to an embodiment of the present disclosure. The first client includes a first processor, and a first memory storing instructions executable by the first processor. The first processor, when executing the instructions, implements the method for caching content as described above.

In a sixth aspect, a second client is provided according to an embodiment of the present disclosure. The second client includes a second processor, and a second memory storing instructions executable by the second processor. The second processor, when executing the instructions, implements the method for reading content as described above.

In a seventh aspect, a storage medium is provided according to an embodiment of the present disclosure. The storage medium stores a program and is applied to the first client and the second client. When the program is executed by a processor, the method for caching content and the method for reading content are implemented.

A method for caching content, a method for reading content, a client, and a storage medium are provided according to embodiments of the present disclosure. In caching, the client acquires the JSON data corresponding to the content to be delivered, and determines the identification information corresponding to the JSON data; groups the JSON data and stores the grouped JSON data according to the identification information to obtain a memory list corresponding to the identification information, and writes the JSON data into the target disk according to the identification information and the memory list; performs video preloading processing on the content to be delivered according to the JSON data to obtain the preloaded video data, and determines the address information corresponding to the preloaded video data; where the preloaded video data is used to partially cache the video data for the content to be delivered; and stores the address information in the memory list and the target disk according to the identification information, so as to complete the caching of the JSON data and the preloaded video data. In reading, after receiving the starting instruction, the client determines the identification information of the JSON data corresponding to the content to be delivered; if the address information corresponding to the preloaded video data exists in the memory list corresponding to the identification information, reads the address information from the memory list, and acquires the preloaded video data according to the address information, where the preloaded video data is used to partially read the content to be delivered; and if the address information corresponding to the preloaded video data does not exist in the memory list corresponding to the identification information, reads the address information from the target disk, and reads the preloaded video data according to the address information. That is, in the present disclosure, the client not only asynchronously caches the JSON data and the preloaded video data corresponding to the content to be delivered into the memory list and the target disk according to the identification information of the data corresponding to the content to be delivered, but also reads the JSON data and the preloaded video data corresponding to the content to be delivered from the memory list or the target disk according to the identification information of the data corresponding to the content to be delivered. It can be seen that, with the method for caching content and the method for reading content according to the present disclosure, the data corresponding to the content to be delivered can be stored separately and read directionally based on the identification information corresponding to the content to be delivered, thereby improving the speed at which the client is stared. Further, the problem of the delay in reading the native splash advertisements is solved, thereby improving the fluency of native splash advertisements.

DETAILED DESCRIPTION OF EMBODIMENTS

The present disclosure is further described in detail below with reference to the accompanying drawings, so that the objectives, technical solutions and advantages of the present disclosure are clearer. The described embodiments should not be construed as limiting the present disclosure. All other embodiments obtained by those skilled in the art without creative efforts fall within the protection scope of the present disclosure.

In the following description, reference is made to "some embodiments," which describes a subset of all possible embodiments. It should be understood, however, that "some embodiments" may be the same or a different subset of all possible embodiments, and may be combined without conflict.

Figure 1:
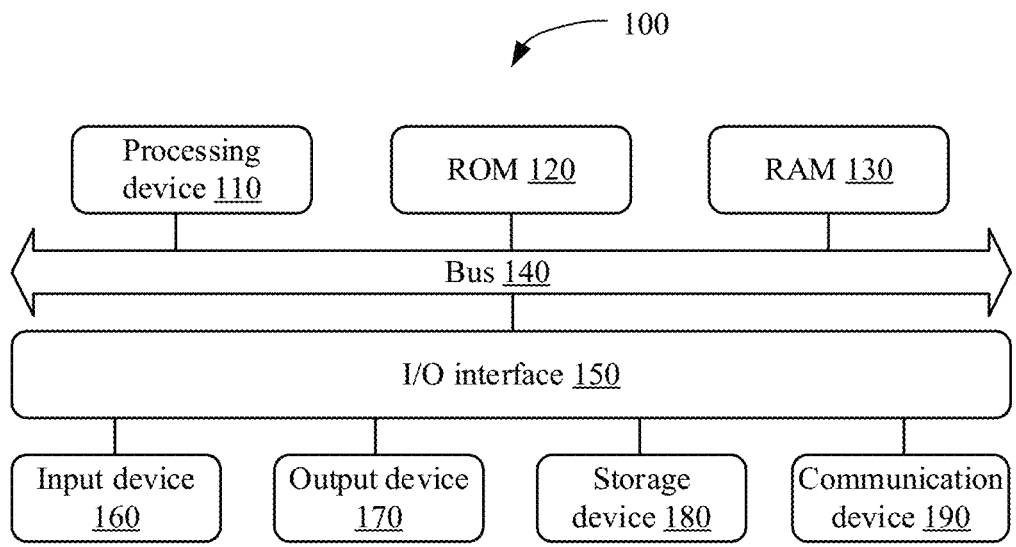
FIG. 1 is a schematic structural diagram showing a client according to an embodiment of the present disclosure.

In the present disclosure, a client is software that can be run in a terminal. Reference is made to FIG. 1 below, which is a schematic structural diagram showing a terminal according to an embodiment of the present disclosure. As shown in FIG. 1, the terminal may include various electronic devices, including but not limited to mobile electronic devices such as mobile phones, notebook computers, digital broadcast receivers, personal digital assistants (PDA), tablet computers (PAD), portable multimedia players (PMP), in-vehicle electronic devices (for example, an in-vehicle navigation electronic device), and fixed electronic devices such as digital televisions (TVs), and desktop computers. The terminal shown in FIG. 1 is only an example, and should not impose any limitations on the functions and scope of use of the embodiments of the present disclosure.

As shown in FIG. 1, the terminal 100 may include a processing device (for example, a central processing unit or a graphics processing unit) 110. The processing device 110 performs various appropriate operations and processing according to a program stored in a read only memory (ROM) 120 or a program loaded from a storage device 180 into a random-access memory (RAM) 130. In the RAM 130, various programs and data necessary for the operation of the terminal 100 are also stored. The processing device 110, the ROM 120, and the RAM 130 are connected to each other through a bus 140. An input/output (I/O) interface 150 is also connected to the bus 140.

Generally, the following devices may be connected to the I/O interface 150: an input device 160 including, for example, a touch screen, a touch pad, a keyboard, a mouse, a camera, a microphone, an accelerometer and a gyroscope; an output device 170 including, for example, a liquid crystal display (LCD), a speaker and a vibrator; a storage device 180 including, for example, a tape and a hard disk; and a communication device 190. The communication device 190 may allow the terminal 100 to perform wireless or wired communication with other device to exchange data. Although FIG. 1 shows the terminal 100 including various devices, it should be understood that not all of the illustrated devices are to be implemented or equipped. More or fewer devices may alternatively be implemented or provided.

According to embodiments of the present disclosure, the processes illustrated in flowcharts may be implemented as a computer software program. For example, a computer program product is provided according to embodiments of the present disclosure. The computer program product includes a computer program carried on a computer readable medium. The computer program includes program code for performing the methods shown in the flowcharts. In such embodiments, the computer program may be downloaded and installed from the network via the communication device 190, or installed from the storage device 180, or installed from the ROM 120. When the computer program is executed by the processing device 110, functions in the methods of the embodiments of the present disclosure are performed.

It should be noted that, the computer-readable medium described above in the embodiments of the present disclosure may be a computer-readable signal medium or a computer-readable storage medium, or a combination of the computer-readable signal medium and the computer-readable storage medium. The computer-readable storage medium may include, but is not limited to, electrical, magnetic, optical, electromagnetic, infrared, or semiconductor systems, apparatuses, or devices, or a combination thereof, for example. Examples of the computer readable storage medium may include, but are not limited to, an electrical connection with one or more wires, a portable computer disk, a hard disk, a RAM, a ROM, an erasable programmable read only memory (EPROM), a flash memory, an optical fiber, a portable compact disk read only memory (CD-ROM), an optical storage device, a magnetic storage device, or a suitable combination of the foregoing.

In the embodiments of the present disclosure, the computer-readable storage medium may be any tangible medium that contains or stores a program that can be used by or in conjunction with an instruction execution system, apparatus, or device. However, the computer-readable signal medium may include a data signal in a baseband or propagated as part of a carrier wave, carrying computer-readable program code therein. The data signal propagated in this way may be in a variety of forms, including but not limited to an electromagnetic signal, an optical signal, or a suitable combination of the foregoing. The computer-readable signal medium may be a computer-readable medium other than the computer-readable storage medium. The computer-readable signal medium is capable of transmitting, propagating, or transporting a program for use by or in connection with the instruction execution system, apparatus, or device. The program code embodied on the computer readable medium may be transmitted by any suitable medium, including but not limited to: a wire, an optical cable, radio frequency (RF) or a suitable combination of the above.

The above computer-readable medium may be included in the terminal 100, or may exist independently without being assembled into the terminal 100.

The above computer-readable medium carries one or more programs. When the one or more programs are executed by the terminal, the terminal 100 performs the method according to the embodiments of the present disclosure.

The computer program code for carrying out operations of the present disclosure may be written in one or more programming languages, or a combination thereof. The one or more programming languages include object-oriented programming languages, such as Java, Smalltalk, C++, and conventional procedural programming languages, such as the "C" language or similar programming languages. The program code may be executed entirely on the user computer, partly on the user computer, as a stand-alone software package, partly on the user computer and partly on a remote computer, or entirely on the remote computer or a server. In the case of a remote computer, the remote computer may be connected to the user computer through any kind of network, including a Local Area Network (LAN) and a Wide Area Network (WAN), or may be connected to an external computer (for example, via the Internet provided by an internet service provider).

The units and/or modules in the terminal described in the embodiments of the present disclosure may be implemented in a software manner or a hardware manner.

In terms of hardware, the units and/or modules implementing the terminal of the embodiments of the present disclosure may be implemented by one or more of an application specific integrated circuit (ASIC), DSP, a programmable logic device (PLD), a complex programmable logic devices (CPLD), a field programmable gate array (FPGA) or other electronic component, for implementing the methods according to the embodiments of the present disclosure.

In terms of software, the units and/or modules in the terminal that implement the method for caching content in the embodiments of the present disclosure may be implemented by two or more units.

The units and/or modules in the device for implementing the method for caching content according to the embodiment of the present disclosure are illustrated below with software as an example.

Figure 2:
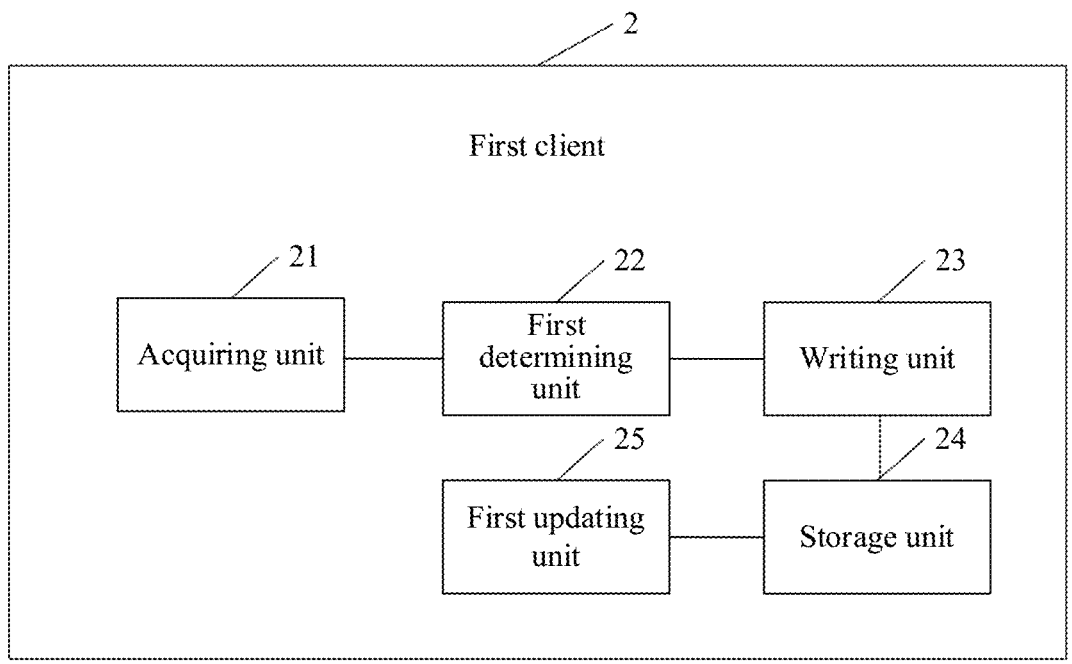
FIG. 2 is a schematic diagram showing a structure of a first client according to an embodiment of the present disclosure.

FIG. 2 is a schematic diagram showing a structure of a first client according to an embodiment of the present disclosure. As shown in FIG. 2, a first client 2 includes an acquiring unit 21, a first determining unit 22, a writing unit 23, a storage unit 24 and a first updating unit 25.

The acquiring unit 21 is configured to acquire JSON data corresponding to content to be delivered.

The first determining unit 22 is configured to determine identification information corresponding to the JSON data.

The acquiring unit 21 is further configured to group the JSON data and store the grouped JSON data according to the identification information, to obtain a memory list corresponding to the identification information.

The writing unit 23 is configured to write the JSON data to a target disk according to the identification information and the memory list.

The acquiring unit 21 is further configured to perform video preloading processing on the content to be delivered according to the JSON data to obtain preloaded video data. The preloaded video data is used for partially caching the video data for the content to be delivered.

The first determining unit 22 is further configured to determine address information corresponding to the preloaded video data.

The storage unit 24 is configured to store the address information in the memory list and the target disk according to the identification information, so as to complete the caching of the JSON data and the preloaded video data.

Further, in the embodiments of the present disclosure, the acquiring unit 21 is configured to store the JSON data with the same identification information in the same list, and generate the memory list corresponding to the identification information. The identification information is in one-to-one correspondence with the memory list.

The acquiring unit 21 is configured to, based on the JSON data and according to a preset data parameter, preload part of all the video data corresponding to the content to be delivered to obtain the preloaded video data.

Further, in the embodiments of the present disclosure, the acquiring unit 21 is further configured to traverse the memory list after the address information is stored in the memory list and the target disk according to the identification information, to perform the video preloading process on the JSON data in the memory list that does not store the address information, so as to obtain all the video data corresponding to the content to be delivered.

The first updating unit 25 is configured to: after the address information is stored in the memory list and the target disk according to the identification information, traverse the memory list and delete expired data in the memory list to obtain an updated memory list; and update the target disk according to the updated memory list.

Figure 3:
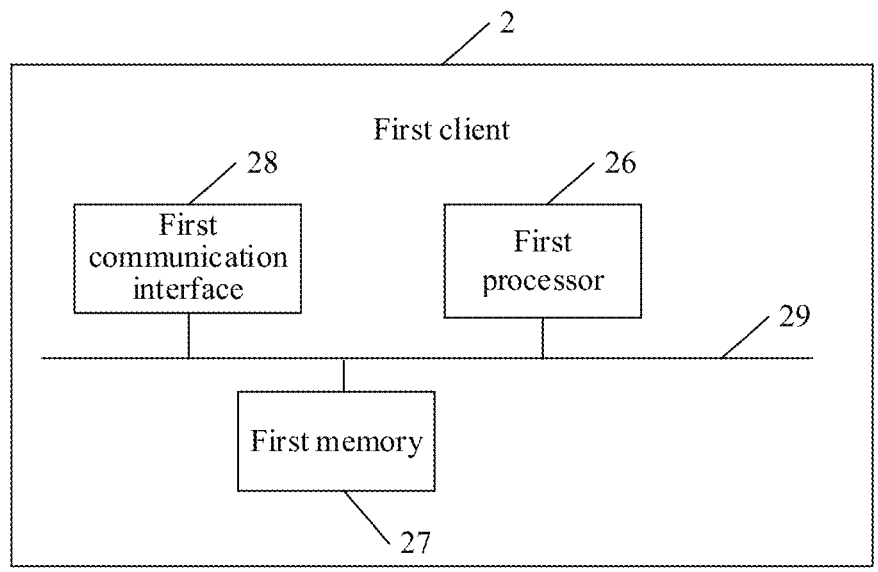
FIG. 3 is a schematic diagram showing a structure of the first client according to another embodiment of the present disclosure.

FIG. 3 is a schematic diagram showing a structure of the first client according to another embodiment of the present disclosure. As shown in FIG. 3, the first client 2 further includes a first processor 26, and a first memory 27 storing instructions executable by the first processor 26. The client 2 further includes a first communication interface 28, and a first bus 29 for connecting the first processor 26, the first memory 27 and the first communication interface 28.

In the embodiments of the present disclosure, the first bus 29 is configured to connect the first communication interface 28, the first processor 26 and the first memory 27 to each other, and communication among these devices are performed through the first bus 29.

In the embodiments of the present disclosure, the first memory 27 is configured to store instructions and data.

Further, in the embodiments of the present disclosure, the first processor 26 is configured to acquire JSON data corresponding to the content to be delivered, and determine the identification information corresponding to the JSON data; group the JSON data and store the grouped JSON data according to the identification information, to acquire a memory list corresponding to the identification information, and write the JSON data to the target disk according to the identification information and the memory list; perform video preloading processing on the content to be delivered according to the JSON data to obtain preloaded video data, and determine address information corresponding to the preloaded video data, where the preloaded video data is used to partially cache the video data for the content to be delivered; and store the address information in the memory list and the target disk according to the identification information, to complete the caching of the JSON data and the preloaded video data.

Figure 4:
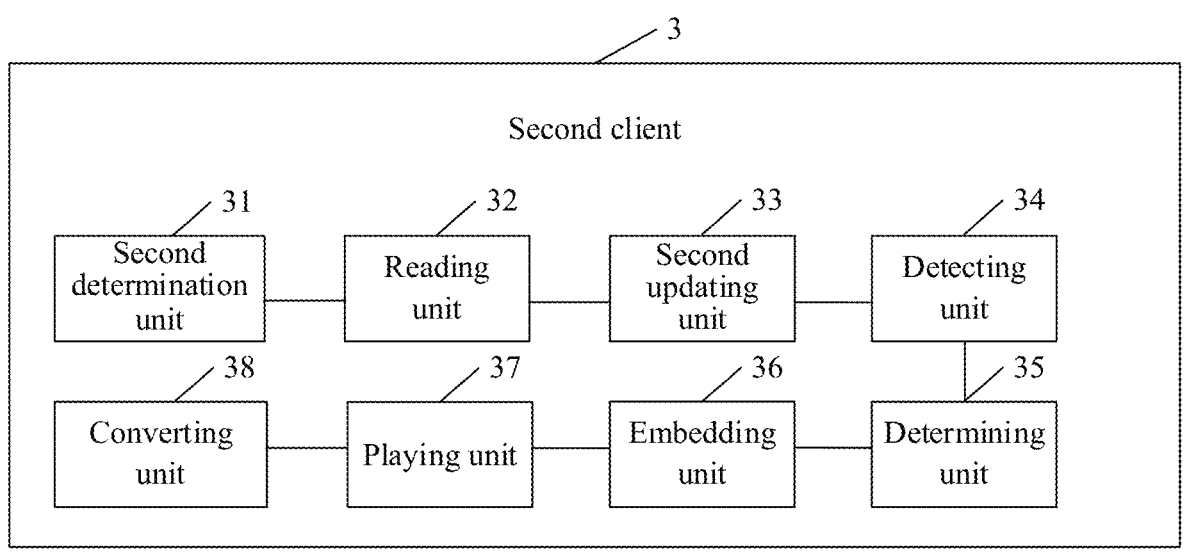
FIG. 4 is a schematic diagram showing a structure of a second client according to an embodiment of the present disclosure.

FIG. 4 is a schematic diagram showing a structure of a second client according to an embodiment of the present disclosure. As shown in FIG. 4, a second client 3 includes a second determining unit 31, a reading unit 32, a second updating unit 33, a detecting unit 34, a determining unit 35, an embedding unit 36, a playing unit 37 and a converting unit 38.

The second determining unit 31 is configured to determine the identification information of the JSON data corresponding to the content after a starting instruction is received.

The reading unit 32 is configured to read, if the address information corresponding to the preloaded video data exists in the memory list corresponding to the identification information, the address information from the memory list, and read the preloaded video data according to the address information. The preloaded video data is used for partially reading the content to be delivered.

The reading unit 32 is further configured to read, if the address information corresponding to the preloaded video data does not exist in the memory list corresponding to the identification information, the address information from the target disk, and read the preloaded video data according to the address information.

Further, in the embodiments of the present disclosure, the second updating unit 33 is configured to read the address information from the target disk, and update the memory list according to the identification information and the address information after the preloaded video data is read according to the address information.

The detecting unit 34 is configured to detect a current state parameter after the identification information of the JSON data corresponding to the content to be delivered is determined.

The determining unit 35 is configured to determine to read the preloaded video data if the current state parameter meets a preset display condition. The preset display condition is used to determine whether to display a splash advertisement video corresponding to the preloaded video data.

Further, in the embodiments of the present disclosure, the embedding unit 36 is configured to embed the preloaded video data into a current information stream after the preloaded video data is read according to the address information, to obtain an information stream to be displayed.

The playing unit 37 is configured to play a target video corresponding to the information stream to be displayed in response to the starting instruction.

The converting unit 38 is configured to perform structure conversion processing on the JSON data after the preloaded video data is read according to the address information, to obtain converted JSON data.

The embedding unit 36 is further configured to embed the converted JSON data into the current information stream.

Figure 5:
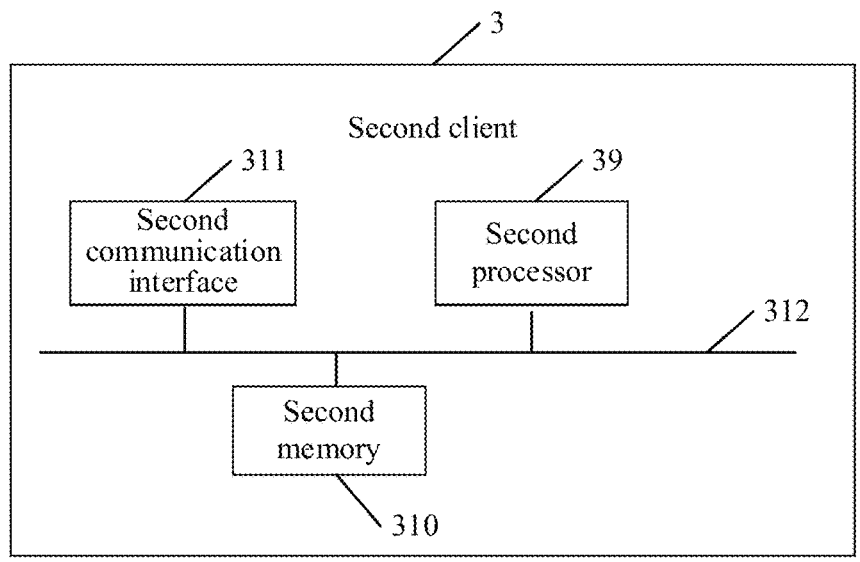
FIG. 5 is a schematic diagram showing a structure of the second client according to another embodiment of the present disclosure.

FIG. 5 is a schematic diagram showing a structure of the second client according to another embodiment of the present disclosure. As shown in FIG. 5, the second client 3 further includes a second processor 39, and a second memory 310 storing instructions executable by the second processor 39. The client 2 further includes a second communication interface 311, and a second bus 312 for connecting the second processor 39, the second memory 310 and the second communication interface 311 to each other.

In the embodiments of the present disclosure, the second bus 312 is configured to connect the second communication interface 311, the second processor 39, and the second memory 310 to each other, and communication among these devices are performed through the second bus 312.

In the embodiments of the present disclosure, the second memory 310 is configured to store instructions and data.

Further, in the embodiments of the present disclosure, the second processor 39 is configured to, after the starting instruction is received, determine the identification information of the JSON data corresponding to the content to be delivered; read the address information from the memory list if the address information corresponding to the preloaded video data exists in the memory list corresponding to the identification information, and read the preloaded video data according to the address information, where the preloaded video data is used to partially read the content to be delivered; and read the address information from the target disk if the address information corresponding to the preloaded video data does not exist in the memory list corresponding to the identification information, and read the preloaded video data according to the address information.

It should be pointed out that the classification of the above units does not constitute a limitation on the client itself. For example, some units each may be split into two or more subunits. Alternatively, some units may be merged into a new unit.

It should also be pointed out that respective names of the above units do not constitute limitations on the units themselves under certain circumstances.

For the same reason, units and/or modules not described in detail in the client do not represent that the corresponding units and/or modules are not included in the client. All operations performed by the client may be implemented by corresponding units and/or modules in the client.

The first client and the second client are provided according to embodiments of the present disclosure. In caching, the first client acquires the JSON data corresponding to the content to be delivered, and determines the identification information corresponding to the JSON data; groups the JSON data and stores the grouped JSON data according to the identification information to obtain a memory list corresponding to the identification information, and writes the JSON data into the target disk according to the identification information and the memory list; performs video preloading processing on the content to be delivered according to the JSON data to obtain the preloaded video data, and determines the address information corresponding to the preloaded video data, where the preloaded video data is used to partially cache the video data for the content to be delivered; and stores the address information in the memory list and the target disk according to the identification information, so as to complete the caching of the JSON data and the preloaded video data. In reading, after receiving the starting instruction, the second client determines the identification information of the JSON data corresponding to the content to be delivered; if the address information corresponding to the preloaded video data exists in the memory list corresponding to the identification information, reads the address information from the memory list, and acquires the preloaded video data according to the address information, where the preloaded video data is used to partially read the content to be delivered; and if the address information corresponding to the preloaded video data does not exist in the memory list corresponding to the identification information, reads the address information from the target disk, and reads the preloaded video data according to the address information. That is, in the present disclosure, the client not only asynchronously caches the JSON data and the preloaded video data corresponding to the content to be delivered into the memory list and the target disk according to the identification information of the data corresponding to the content to be delivered, but also reads the JSON data and the preloaded video data corresponding to the content to be delivered from the memory list or the target disk according to the identification information of the data corresponding to the content to be delivered. It can be seen that, with the method for caching content and the method for reading content according to the present disclosure, the data corresponding to the content to be delivered can be stored separately and read directionally based on the identification information corresponding to the content to be delivered, thereby improving the speed at which the client is stared. Further, the problem of the delay in reading the native splash advertisements is solved, thereby improving the fluency of native splash advertisements.

Figure 6:
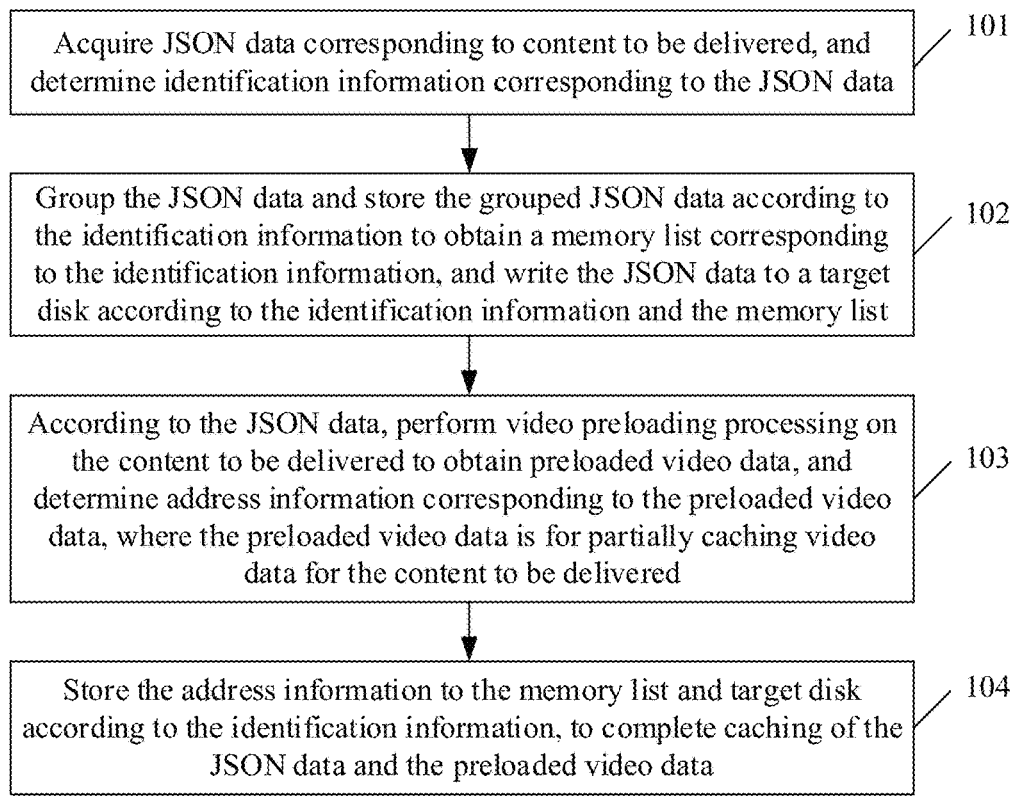
FIG. 6 is a schematic flowchart showing a method for caching content according to an embodiment of the present disclosure.

In an embodiment of the present disclosure, reference is made to FIG. 6, which is a schematic flowchart showing a method for caching content according to an embodiment of the present disclosure. As shown in FIG. 6, the method for the client to cache content to be delivered includes the following steps 101 to 104.

In step 101, JSON data corresponding to the content to be delivered is acquired, and identification information corresponding to the JSON data is determined.

In the embodiments of the present disclosure, the client acquires the JSON data corresponding to the content to be delivered, and then determines the identification information corresponding to the JSON data. The identification information is used to group the JSON data and store the grouped JSON data.

It should be noted that, in the embodiments of the present disclosure, the client in the terminal refers to a program corresponding to the server and providing local services for the client. Except for some applications that only run locally, the client is generally installed on a common terminal and cooperates with the server to run.

After the development of the Internet, commonly used clients include web browsers used in the World Wide Web, email clients for sending and receiving emails, and client software for instant messaging. For this type of application, there are corresponding servers and service programs in the network to provide corresponding services, such as database services and e-mail services. In this way, a specific communication connection is established between the terminal and the server to ensure the normal operation of the application.

It should be noted that, in the embodiments of the present disclosure, the server may serve the client, such as providing resources to the client, storing client data.

Further, in the embodiments of the present disclosure, the client acquires the JSON data corresponding to the content to be delivered through the communication connection between the terminal and the server. The JSON data is transmitted by the server. The native splash advertisement is a short-lived full-screen advertisement displayed when the client application starts. Since the user attention is concentrated when the client application is just started, the splash advertisement is especially suitable for the advertisers to carry out brand exposure promotion.

It should be noted that, in the embodiments of the present disclosure, JavaScript Object Notation (JSON) is a lightweight data exchange format, which is based on a subset of ECMAScript (that is, js specification developed by the European Computer Association) and stores and represents data in a text format that is completely independent of the programming language. JSON is an ideal data exchange language due to its concise and clear hierarchy. The JSON data is easy to read and write, and easy for machines to parse and generate, effectively improving network transmission efficiency.

Further, in the embodiments of the present disclosure, after acquiring the JSON data corresponding to the content to be delivered that is transmitted by the server, the client determines the identification information corresponding to the JSON data. The client reads splash_id in the JSON data, and then determines the identification information based on the splash_id.

It should be noted that, in the embodiments of the present disclosure, in order to acquire the identification information based on the splash_id, the client determines an id tail number of the splash_id as the identification information corresponding to the JSON data. For example, the identification information corresponding to the data whose splash_id is 100000001 is 1, and the identification information corresponding to the data whose splash_id is 100000002 is 2.

In step 102, the JSON data is grouped and stored according to the identification information, a memory list corresponding to the identification information is obtained, and the JSON data is written into the target disk according to the identification information and the memory list.

In the embodiments of the present disclosure, after acquiring the JSON data corresponding to the content to be delivered and determining the identification information corresponding to the JSON data, the client groups the JSON data and stores the grouped JSON data according to the identification information to obtain the memory list corresponding to the identification information, and then writes the JSON data to the target disk based on the identification information and the memory list.

It should be noted that, in the embodiments of the present disclosure, the client caches the content to be delivered separately, that is, in the memory and in the disk. That is, after acquiring the JSON data corresponding to the content to be delivered from the server, the client caches the JSON data in the memory and the disk sequentially.

Further, in the embodiments of the present disclosure, when the JSON data is grouped and stored according to the identification information, the client stores the JSON data with the same identification information in the same list, so as to store the JSON data in groups. For example, all JSON data whose identification information is 1 is cached in a memory list 1, and all JSON data whose identification information is 2 is cached in a memory list 2. That is, in the present disclosure, the client stores the JSON data corresponding to the content to be delivered in memory lists according to the identification information, so that the JSON data is stored in the memory.

It should be noted that, in the embodiments of the present disclosure, after storing the JSON data corresponding to the content to be delivered in different memory lists according to the identification information, the client stores the JSON data corresponding to the content to be delivered in the disk, that is, writes the JSON data to the target disk according to the identification information and the memory list.

Further, in the embodiments of the present disclosure, in order to write the JSON data into the target disk, after establishing the memory list, the client adds tasks into a queue, so that a sub-thread is started to asynchronously copy and encode data in the memory list corresponding to the identification information and write the data to the target disk so as to avoid blocking the main thread.

In step 103, video preload processing is performed on the content to be delivered according to the JSON data to obtain preload video data, and address information corresponding to the preload video data is determined. The preloaded video data is used for partially caching video data for the content to be delivered.

In the embodiments of the present disclosure, after grouping the JSON data and storing the grouped JSON data according to the identification information to obtain the memory list corresponding to the identification information, and writing the JSON data to the target disk according to the identification information and the memory list, the client performs the video preloading processing on the content to be delivered according to the JSON data to obtain the preloaded video data, and determines the address information corresponding to the preloaded video data.

It should be noted that the method for caching content according to the embodiment of the present disclosure is applicable to both the caching of JSON data corresponding to the content to be delivered and the caching of video data corresponding to the content to be delivered.

It should be noted that, in the embodiments of the present disclosure, the client first performs video preloading processing on the content to be delivered according to the JSON data, so as to obtain the preloaded video data after loading. The preloaded video data is part of all the video data corresponding to the content to be delivered rather than all the video data corresponding to the content to be delivered. That is, in the present disclosure, the preloaded video data may be used for partially caching video data for the content to be delivered.

Further, in the embodiments of the present disclosure, the client loads the video data according to a preset data parameter, so that the obtained preloaded video data meets a certain data size. For example, the size of all the video data corresponding to the content to be delivered is 3 M, and a preload size field delivered by the server, that is, the preset data parameter, is 800 k. The client requests the first 800 k video data corresponding to the content to be delivered to the local according to the preset data parameter, so as to ensure that the first few seconds of the display is played smoothly, and the subsequent content is requested in real time, thereby saving traffic for the user.

It should be noted that, in the embodiments of the present disclosure, after acquiring the preloaded video data, the client first determines the address information corresponding to the preloaded video data, and then updates the memory list and the target disk according to the address information.

In step 104, the address information is stored in the memory list and the target disk according to the identification information, so as to complete the caching of JSON data and the preloaded video data.

In the embodiments of the present disclosure, after the video preloading processing is performed on the content to be delivered according to JSON data to obtain the preloaded video data, and determining the address information corresponding to the preloaded video data, the client stores the address information in the memory list and the target disk according to the identification information, so that the caching of the JSON data and the preloaded video data is completed.

Further, in the embodiments of the present disclosure, the client stores the JSON data in the memory list and the target disk sequentially based on the identification information, so as to cache the JSON data. Correspondingly, the client stores the address information corresponding to the video data in the memory list and the target disk sequentially based on the identification information, so as to cache the video data.

It should be noted that, in the embodiments of the present disclosure, the client loads the video data of the native splash advertisement based on a special queue.

Further, in the embodiments of the present disclosure, after acquiring the preloaded video data and determining the address information of the preloaded video data, the client records the address information in the corresponding JSON data. That is, the client adds the address information to the corresponding memory list according to the identification information, and then updates the target disk according to the address information.

It should be noted that, in the embodiments of the present disclosure, the content is cached separately, that is, in a memory and a disk. The cached content of the splash advertisement includes JSON data and video data. Therefore, after the client stores the JSON data and the address information of the video data in the memory list and the target disk sequentially according to the identification information, the content is cached.

With the method for caching content according to the embodiments of the present disclosure, in caching, the client acquires the JSON data corresponding to the content to be delivered, and determines the identification information corresponding to the JSON data; groups the JSON data and stores the grouped JSON data according to the identification information to obtain a memory list corresponding to the identification information, and writes the JSON data into the target disk according to the identification information and the memory list; performs video preloading processing on the content to be delivered according to the JSON data to obtain the preloaded video data, and determines the address information corresponding to the preloaded video data, where the preloaded video data is used to partially cache the video data for the content to be delivered; and stores the address information in the memory list and the target disk according to the identification information, so as to complete the caching of the JSON data and the preloaded video data. That is, in the present disclosure, the client not only asynchronously caches the JSON data and the preloaded video data corresponding to the content to be delivered into the memory list and the target disk according to the identification information of the data corresponding to the content to be delivered, but also reads the JSON data and the preloaded video data corresponding to the content to be delivered from the memory list or the target disk according to the identification information of the data corresponding to the content to be delivered. It can be seen that, with the method for caching content and the method for reading content according to the present disclosure, the data corresponding to the content to be delivered can be stored separately and read directionally based on the identification information corresponding to the content to be delivered, thereby improving the speed at which the client is stared. Further, the problem of the delay in reading the native splash advertisements is solved, thereby improving the fluency of native splash advertisements.

Based on the above embodiments, in another embodiment of the present disclosure, in order to group the JSON data and store the grouped JSON data according to the identification information to obtain the memory list corresponding to the identification information, the client stores the JSON data with the same identification information in the same list, so that a memory list corresponding to the identification information is generated.

It should be noted that, in the embodiments of the present disclosure, one piece of identification information corresponds to one memory list. The identification information of the JSON data may be the id tail number of splash_id, or may be other identification character, which are not limited in the embodiments of the present disclosure. For example, in a case that the id tail number of splash_id serves as the identification information corresponding to the JSON data, the memory list 1 stores JSON data with splash_id of 100000001, 100000011, 100001001 and the like whose identification information is 1, and the memory list 2 stores JSON data with splash_id of 100000002, 100000012, 100001002 and the like whose identification information is 2.

In the embodiments of the present disclosure, in order to perform video preloading processing on the content to be delivered according to JSON data to obtain the preloaded video data, the client preloads, based on the JSON data, part of all the video data corresponding to the content to be delivered according to the preset data parameter, so as to obtain the preloaded video data.

It should be noted that, in the embodiments of the present disclosure, the preset data parameter may be used to limit the data size of the video data to be preloaded. The preset data parameter may be an upper limit value of a field size. The preloaded video data obtained by the client loading the video data according to the preset data parameter meets a certain data size. The preset data parameter may be delivered by the server. For example, the size of all video data corresponding to the content to be delivered is 2 M, and the preset data parameter delivered by the server is 810 k. The client requests the first 800 k video data corresponding to the content to be delivered to the local according to the preset data parameter, so as to ensure that the first few seconds of the display is played smoothly, and the subsequent content is requested in real time, thereby saving traffic for the user.

In the embodiments of the present disclosure, after storing the address information in the memory list and the target disk according to the identification information, the client traverses the memory list, and performs video preload processing on JSON data in the memory list that does not store address information, so as to obtain all the video data corresponding to the content to be delivered.

It should be noted that, in the embodiments of the present disclosure, the preloaded video data is part of all the video data corresponding to the content to be delivered. Therefore, the client traverses all memory lists after caching the preloaded video data and storing the address information corresponding to the preloaded video data in the memory list. If there is no JSON data corresponding to the stored address information in the memory list, the video preloading process on the content to be delivered is continued for the JSON data, until all the JSON data corresponding to the content to be delivered have the corresponding video data cached, so that all video data corresponding to the content to be delivered is obtained. That is, in the present disclosure, after caching the preloaded video data, the client traverses all the data in the memory, and performs the video preloading processing on the data for which no video is cached. The video preloading processing is not performed if there is already a cached video locally.

In the embodiments of the present disclosure, after storing the address information in the memory list and the target disk according to the identification information, the client traverses the memory list, and deletes the expired data in the memory list to obtain the updated memory list, and then updates the target disk according to the updated memory list.

It should be noted that, in the embodiments of the present disclosure, the client traverses all memory lists after preloading the video data and storing the address information corresponding to the preloading video data in the memory list. If there is expired JSON data in the memory list, the client deletes the expired JSON data to update the memory list. After updating the memory list, the client updates the target disk according to the updated memory list, to delete the expired JSON data cached in the target disk. That is, in the present disclosure, after caching the preloaded video data, the client traverses all the data in the memory, deletes the expired data to update the memory list, and then updates the disk asynchronously, so that the content to be delivered is updated.

With the method for caching content according to the embodiments of the present disclosure, in caching, the client acquires the JSON data corresponding to the content, and determines the identification information corresponding to the JSON data; groups the JSON data and stores the grouped JSON data according to the identification information to obtain a memory list corresponding to the identification information, and writes the JSON data into the target disk according to the identification information and the memory list; performs video preloading processing on the content to be delivered according to the JSON data to obtain the preloaded video data, and determines the address information corresponding to the preloaded video data, where the preloaded video data is used to partially cache the video data for the content to be delivered; and stores the address information in the memory list and the target disk according to the identification information, so as to complete the caching of the JSON data and the preloaded video data. That is, in the present disclosure, the client not only asynchronously caches the JSON data and the preloaded video data corresponding to the content to be delivered into the memory list and the target disk according to the identification information of the data corresponding to the content to be delivered, but also reads the JSON data and the preloaded video data corresponding to the content to be delivered from the memory list or the target disk according to the identification information of the data corresponding to the content to be delivered. It can be seen that, with the method for caching content and the method for reading content according to the present disclosure, the data corresponding to the content to be delivered can be stored separately and read directionally based on the identification information corresponding to the content to be delivered, thereby improving the speed at which the client is stared. Further, the problem of the delay in reading the native splash advertisements is solved, thereby improving the fluency of native splash advertisements.

Figure 7:
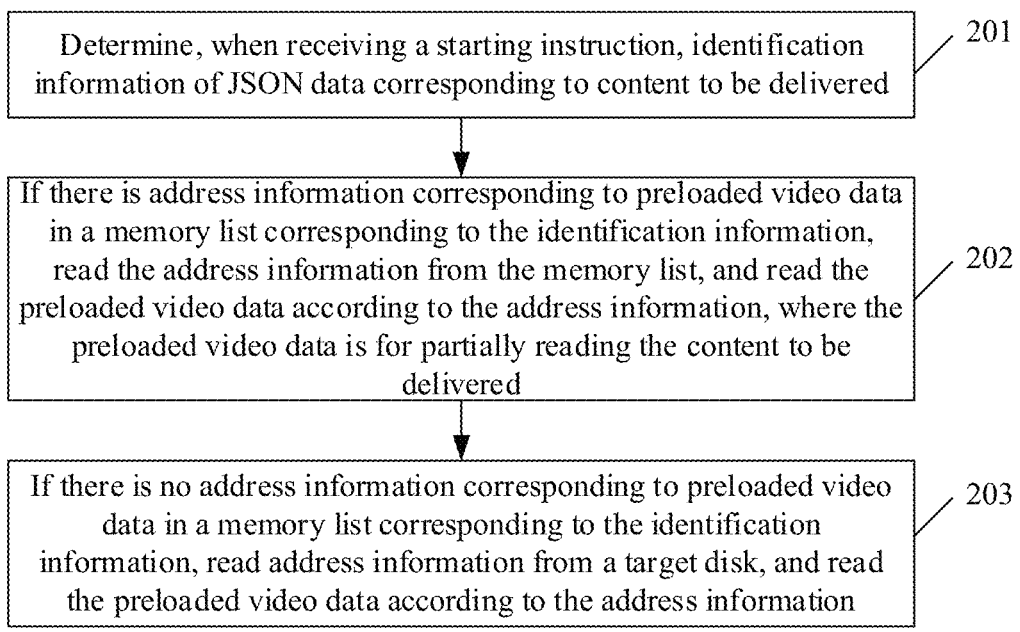
FIG. 7 is a schematic flowchart showing a method for reading content according to an embodiment of the present disclosure.

Based on the above embodiments, in another embodiment of the present disclosure, reference is made to FIG. 7, which is a schematic flowchart showing a method for reading content according to an embodiment of the present disclosure. As shown in FIG. 7, the method for the client to read the content to be delivered includes the following steps 201 to 203.

In step 201, after a starting instruction is received, the identification information of the JSON data corresponding to the content to be delivered is determined.

In the embodiment of the present disclosure, when receiving the starting instruction, the client determines the identification information of the JSON data corresponding to the content to be delivered. The client receives the starting instruction in various ways. For example, the client receives the starting instruction through a user touch operation received by the terminal. Alternatively, the client receives the starting instruction through the triggering of the starting mechanism preset by the terminal.

It should be noted that, in the embodiments of the present disclosure, after receiving the starting instruction, the client determines the identification information of the JSON data corresponding to the content to be delivered that is to be displayed. In the present disclosure, a definition strategy of the identification information for the client to read the content to be delivered is the same as the way of defining the identification information when the client caches the content to be delivered. That is, although the client determines the identification information of the JSON data corresponding to the content to be delivered in various ways, the client determines the identity information of the JSON data in the same way when caching and reading the content to be delivered.

Further, in the embodiments of the present disclosure, the client first determines the identification information corresponding to the JSON data of the content to be delivered. The client reads the splash_id in the JSON data, and then determines the identification information based on the splash_id.

It should be noted that, in the embodiments of the present disclosure, the client determines the id tail number of splash_id as the identification information of the corresponding JSON data. For example, the identification information corresponding to the data whose splash_id is 100000001 is 1, and the identification information corresponding to the data whose splash_id is 100000002 is 2.

In step 202, if address information corresponding to the preloaded video data exists in the memory list corresponding to the identification information, the address information is read from the memory list, and the preloaded video data is read according to the address information. The preloaded video data is used for partially reading the content to be delivered.

In the embodiments of the present disclosure, after determining the identification information of the JSON data corresponding to the content to be delivered, the client reads the address information from the memory list if the address information corresponding to the preloaded video data exists in the memory list corresponding to the identification information, and reads the preloaded video data according to the address information.

It should be noted that, in the embodiments of the present disclosure, the preloaded video data is for partially reading the content to be delivered. That is, in the embodiments of the present disclosure, the preloaded video data is part of all the video data corresponding to the content to be delivered rather than all the video data corresponding to the content to be delivered. That is, in the present disclosure, the client partially acquires the video data corresponding to the content to be delivered by reading the preloaded video data.

Further, in the embodiments of the present disclosure, after determining the identification information of the JSON data corresponding to the content to be delivered, the client traverses a memory list according to the identification information, so as to determine whether there is address information corresponding to the preloaded video data in the memory list.

It should be noted that, in the embodiments of the present disclosure, the client caches the content to be delivered separately, that is, in the memory and in the disk. That is, after acquiring the JSON data corresponding to the content to be delivered from the server, the client caches the JSON data in the memory and the disk sequentially.

It should be noted that the method for caching content according to the embodiment of the present disclosure is applicable to both the caching of JSON data corresponding to the content to be delivered and the caching of video data corresponding to the content to be delivered.

Further, in the embodiments of the present disclosure, when storing the JSON data in groups according to the identification information, the client stores the JSON data with the same identification information in the same list. Therefore, when reading the content, the client first determines the corresponding memory list according to the identification information, and then searches the memory list. For example, in a case that the identification information of the JSON data is 1, the client searches the memory list 1. In a case that the identification information of the JSON data is 2, the client searches the memory list 2. That is, in the present disclosure, the client reads data from the memory list corresponding to the identification information according to the identification information, without traversing all the data corresponding to the content to be delivered.

It should be noted that, in the embodiments of the present disclosure, after searching the corresponding memory list according to the identification information, the client directly reads the address information corresponding to the preloaded video data from the memory list when determining that there is address information corresponding to the preloaded video data in the memory list, and then reads the preloaded video data according to the address information.

In step 203, if no address information corresponding to the preloaded video data exists in the memory list corresponding to the identification information, the address information is read from the target disk, and the preloaded video data is read according to the address information.

In the embodiments of the present disclosure, after determining the identification information of the JSON data corresponding to the content to be delivered, the client reads the address information from the target disk if the address information corresponding to the preloaded video data does not exist in the memory list corresponding to the identification information, and reads the preloaded video data according to the address information.

Further, in the embodiments of the present disclosure, the client stores the JSON data in the memory list and the target disk in sequentially based on the identification information, so as to cache the JSON data. Correspondingly, the client stores the address information corresponding to the video data in the memory list and the target disk sequentially based on the identification information, so as to cache the video data.

It should be noted that, in the embodiments of the present disclosure, the content is cached separately, that is, in a memory and a disk. The cached content of the splash advertisement includes JSON data and video data. Therefore, after the client stores the JSON data and address information of the video data in the memory list and the target disk sequentially according to the identification information, the content is cached.

Further, in the embodiments of the present disclosure, after the client searches the corresponding memory list according to the identification information, the client fails to directly read the address information corresponding to the preloaded video data from the memory list if it is determined that the address information corresponding to the preloaded video data does not exist in the memory list. Since the client caches the content to be delivered separately, that is, in the memory and in the disk, the client reads the address information corresponding to the preloaded video data from the target disk when failing to read the address information from the memory list, and then reads the preloaded video data according to the address information.

It can be known from the above method for reading content from steps 201 to 203 that in the present disclosure, after the client receives the starting instruction, a splash module of the client selects a list of splash_id of the content to be delivered that may be displayed according to the internal frequency control logic of the splash module. The client queries whether the video data corresponding to the identification information is downloaded and is eligible for display. In this case, the memory list of the corresponding number is preferentially read according to the identification information (which corresponds to low overhead). In a case of no preloaded video data in the memory list, data cached in the disk is read (which corresponds to high overhead), so as to obtain the address information corresponding to the preloaded video data, and read the preloaded video data.

It should be noted that, in the embodiments of the present disclosure, after reading the address information corresponding to the identification information from the target disk, the client updates the memory list corresponding to the identification information according to the address information. In this way, it is unnecessary to read the preloaded video data corresponding to the identification information from the target disk next time, thereby saving overhead.

With the method for reading content according to the embodiment of the present disclosure, in reading, after receiving the starting instruction, the client determines the identification information of the JSON data corresponding to the content; if the address information corresponding to the preloaded video data exists in the memory list corresponding to the identification information, reads the address information from the memory list, and acquires the preloaded video data according to the address information, where the preloaded video data is used to partially read the content to be delivered; and if the address information corresponding to the preloaded video data does not exist in the memory list corresponding to the identification information, reads the address information from the target disk, and reads the preloaded video data according to the address information. That is, in the present disclosure, the client not only asynchronously caches the JSON data and the preloaded video data corresponding to the content to be delivered into the memory list and the target disk according to the identification information of the data corresponding to the content to be delivered, but also reads the JSON data and the preloaded video data corresponding to the content to be delivered from the memory list or the target disk according to the identification information of the data corresponding to the content to be delivered. It can be seen that, with the method for caching content and the method for reading content according to the present disclosure, the data corresponding to the content to be delivered can be stored separately and read directionally based on the identification information corresponding to the content to be delivered, thereby improving the speed at which the client is stared. Further, the problem of the delay in reading the native splash advertisements is solved, thereby improving the fluency of native splash advertisements.

Based on the above embodiments, in another embodiment of the present disclosure, after the client determines the identification information of the JSON data corresponding to the content to be delivered, the method for the client to read the content to be delivered further includes the following steps 204 to 205.

In step 204, a current state parameter is detected.

In the embodiments of the present disclosure, after the identification information of the JSON data corresponding to the content to be delivered is determined, the client detects the current state parameter of the client.

Further, in the embodiments of the present disclosure, the client first detects the state of the client to obtain the current state parameter, so as to further determine whether to display the content to be delivered according to the current state parameter.

That is, in the embodiments of the present disclosure, the current state parameter may be used to determine whether the client has the conditions for displaying the content to be delivered.

It should be noted that, in the embodiments of the present disclosure, the current state parameter may include, but is not limited to, at least one of various state parameters such as a data loading state, a data invalidation state, a display timing state, and an information stream insertion state.

Further, in the embodiments of the present disclosure, the data loading state in the current state parameter represents whether the client has finished loading the video data corresponding to the content to be delivered. The data invalidation state in the current state parameter is used to determine whether the data cached by the client is expired or invalid. The display timing state in the current state parameter is used to determine whether the client is at the display timing. The information stream insertion state in the current state parameter may be used by the client to determine whether the content to be delivered is inserted into the information stream.

In step 205, if the current state parameter meets the preset display condition, it is determined to read the preloaded video data. The preset display condition is used to determine whether to display the splash advertisement video corresponding to the preloaded video data.

It should be noted that, in the embodiments of the present disclosure, the client may preset a determination condition for whether to display the content to be delivered, that is, the preset display condition. That is, in the embodiments of the present disclosure, the preset display condition is used for the client to determine based on the current state parameter whether to display the splash advertisement video corresponding to the preloaded video data.

Further, in the embodiments of the present disclosure, after acquiring the current state parameter, the client determines according to the current state parameter and the preset display condition whether to display the content to be delivered. If it is determined to display the content to be displayed, the client reads the preloaded video data, that is, the above step 202 or 203 is performed. For example, the current state parameter acquired by the client detection meets the preset display conditions such as the preloaded video data is loaded successfully, the data is validated, the client is at the display timing, and the current information stream allows the insertion of the splash advertisement, the client reads the preloaded video.

In the embodiments of the present disclosure, after the client reads the preloaded video data according to the address information, the method for the client to read the content to be delivered further includes the following steps 206 to 207.

In step 206, the preloaded video data is embedded into the current information stream to obtain the information stream to be displayed.

In the embodiments of the present disclosure, after reading the preloaded video data, the client embeds the preloaded video data into the current information stream, so as to obtain the information stream to be displayed.

It should be noted that, in the embodiments of the present disclosure, after determining to display the content to be delivered and reading the corresponding preloaded video data, the client inserts the preloaded video data into the original current information stream to be displayed to obtain the information stream to be displayed. The information stream to be displayed seamlessly and smoothly splices and displays the content to be delivered and the current information stream.

Further, in the embodiments of the present disclosure, the display of the content to be delivered is divided into a splash stage and an information stream stage. The seamless transition from the splash stage to the information stream stage lies in visual switching, which is achieved by adjusting the display level of the video from the display.

In step 207, in response to the starting instruction, the target video corresponding to the information stream to be displayed is played.

In the embodiments of the present disclosure, after embedding the preloaded video data into the current information stream and obtaining the information stream to be displayed, the client plays the target video corresponding to the information stream to be displayed in response to the starting instruction, so as to display the content to be delivered.

Further, in the embodiments of the present disclosure, the information stream to be displayed is obtained by the client by embedding preloaded video data into the current information stream. Therefore, the target video corresponding to the information stream to be displayed includes the splash advertisement video corresponding to the preloaded video data, and the natural information stream video corresponding to the current information stream.

It should be noted that, in the embodiments of the present disclosure, the display of the content to be delivered is divided into a splash stage and an information stream stage, that is, the content to be delivered includes a splash advertisement video and a natural information stream video.

Figure 8:
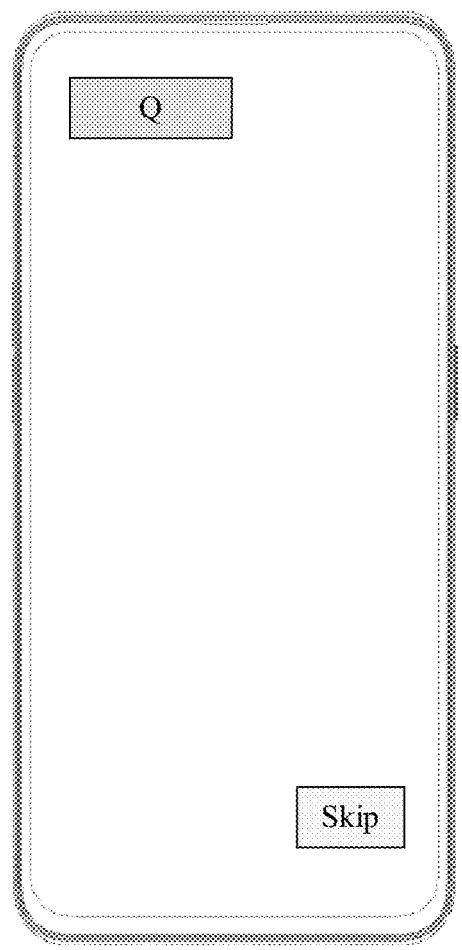
FIG. 8 is a schematic diagram showing a splash stage.

Further, in the embodiment of the present disclosure, in the splash stage, the splash advertisement video, may be displayed as a pure video. FIG. 8 is a schematic diagram showing a splash stage. As shown in FIG. 8, in the splash stage of displaying the native splash advertisement, the client displays a pure video interface. In the video interface, the client logo "Q" is displayed in the upper left corner, and there is a skip button in the upper right corner.

Further, in the embodiments of the present disclosure, the information stream stage, that is, the natural information stream video is the same as the common information stream advertisement in the interaction of each advertisement component. In the information stream stage, the client updates the number of comments and likes of the natural information stream video in real time, this is because the preloaded video data is loaded before. Further, in the display information stream stage, the client forcibly turns on restrictions such as the current privacy status and comment switch, thereby preventing abnormal cases at the beginning of the delivery.

It should be noted that, in the embodiments of the present disclosure, the information stream to be displayed is obtained by the client by embedding preloaded video data into the current information stream, that is, the content to be delivered is already in the feed stream. Therefore, when displaying the content to be delivered based on the target video corresponding to the information stream to be displayed, the client switches between the splash advertisement video and the natural information stream video through a swipe-up operation or swipe-down operation received by the terminal.

That is, when playing the splash advertisement video in the target video corresponding to the information stream to be displayed, the client switches the splash advertisement video to the natural information stream video when receiving the user swipe-up operation through the terminal. When playing the natural information stream video in the target video corresponding to the information stream to be displayed, the client switches the natural information stream video to the splash advertisement video when receiving the user swipe-down operation through the terminal. Therefore, smooth transition between the splash advertisement video and the natural information stream video is achieved, and the splash stage and the information stream stage are seamlessly spliced.

In the embodiments of the present disclosure, after reading the preloaded video data according to the address information, the client first performs structure conversion processing on the JSON data to obtain the converted JSON data, and then embeds the converted JSON data into the current information stream.

In the embodiments of the present disclosure, before playing the target video corresponding to the information stream to be displayed and after receiving the starting instruction, the client acquires a pre-stored simulation starting image and/or a pre-stored simulation starting video, and then displays the pre-stored simulation starting image and/or the pre-stored simulation starting video in response to the starting instruction.

It should be noted that, in the embodiments of the present disclosure, the client pre-stores a pre-stored simulation starting image and/or a pre-stored simulation starting video. The pre-stored simulation starting image and/or the pre-stored simulation starting video is used to avoid play freezes.

Further, in the embodiments of the present disclosure, in order to avoid the display of the empty feed caused by the play freezes, after receiving the starting instruction and being started, the client forms an illusion of starting by displaying the pre-stored simulation starting image and/or the pre-stored simulation starting video.

It should be noted that, in the embodiments of the present disclosure, after displaying the pre-stored simulation starting image and/or the pre-stored simulation starting video in response to the starting instruction, when the display of the target video is ready, the client removes the pre-stored simulation starting image and/or the pre-stored simulation starting video when playing the target video corresponding to the information stream to be displayed, thereby entering a display interface of the content to be delivered.

Figure 9:
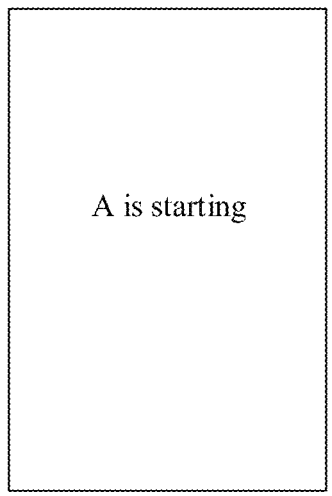
FIG. 9 is a schematic diagram showing a pre-stored simulation starting image.

FIG. 9 is a schematic diagram showing a pre-stored simulation starting image. As shown in FIG. 9, after receiving a starting instruction, a client A first displays a pre-stored simulation starting image when starting. The client A shows the user the state that the client A is still being started by displaying the simulation starting image.

It should be noted that, in the conventional technology, all the data of the locally cached content to be delivered is read into the memory in the load method, which statistically affects statistics of duration for starting. In fact, this step is made into lazy loading, and is performed when the Software Development Kit (SDK) calls the pick method to select the native splash data. That is, in the conventional technology, data reading is performed before the splash SDK is started. However, in the present disclosure, the data is read after the SDK is started.

Further, since it is actually unnecessary to read all the cached data in one pick, a method for caching content in separately and a method for directionally reading content are provided according to the present disclosure. That is, plans corresponding to the content to be delivered each have a splash_id, and all the data related to the splash_id are stored together in the conventional technology, but are stored separately in the present disclosure. For example, the data ending in 1 is cached in one memory list, and the data ending in 2 is cached in another memory list, that is, all data is cached in 10 memory lists that are different from each other. When the SDK asks the client whether to display the content to be delivered having No. 123456789, the client reads the memory list corresponding to the tail number 9 and searches the memory list for 123456789, thereby reducing performance overhead in one read.

It can be seen that, according to the method for caching content and the method for reading content in the embodiments of the present disclosure, the data corresponding to the content to be delivered is stored separately and read directionally based on the identification information corresponding to the content to be delivered.

With the method for reading content according to the embodiment of the present disclosure, in reading, after receiving the starting instruction, the client determines the identification information of the JSON data corresponding to the content; if the address information corresponding to the preloaded video data exists in the memory list corresponding to the identification information, reads the address information from the memory list, and acquires the preloaded video data according to the address information, where the preloaded video data is used to partially read the content to be delivered; and if the address information corresponding to the preloaded video data does not exist in the memory list corresponding to the identification information, reads the address information from the target disk, and reads the preloaded video data according to the address information. That is, in the present disclosure, the client not only asynchronously caches the JSON data and the preloaded video data corresponding to the content to be delivered into the memory list and the target disk according to the identification information of the data corresponding to the content to be delivered, but also reads the JSON data and the preloaded video data corresponding to the content to be delivered from the memory list or the target disk according to the identification information of the data corresponding to the content to be delivered. It can be seen that, with the method for caching content and the method for reading content according to the present disclosure, the data corresponding to the content to be delivered can be stored separately and read directionally based on the identification information corresponding to the content to be delivered, thereby improving the speed at which the client is stared. Further, the problem of the delay in reading the native splash advertisements is solved, thereby improving the fluency of native splash advertisements.

A computer-readable storage medium is provided according to an embodiment of the present disclosure. A program is stored in the computer-readable storage medium. When the program is executed by the processor, the method for caching content and the method for reading content as described above are implemented.

Program instructions corresponding to the method for caching content and the method for reading content in the embodiments of the present disclosure may be stored in a storage medium such as an optical disk, a hard disk, and a U disk. A client, when reading or executing a program instruction corresponding to the method for caching content in the storage medium, acquires JSON data corresponding to content to be delivered, and determines identification information corresponding to the JSON data; groups the JSON data and stores the grouped JSON data according to the identification information to obtain a memory list corresponding to the identification information, and writes the JSON data to a target disk according to the identification information and the memory list; performs video preloading processing on the content to be delivered according to the JSON data to obtain preloaded video data, and determines address information corresponding to the preloaded video data, where the preloaded video data is for partially caching video data for the content to be delivered; and stores the address information to the memory list and the target disk according to the identification information, to complete caching of the JSON data and the preloaded video data.

A client, when reading or executing a program instruction corresponding to the method for reading content in the storage medium, determines, when receiving a starting instruction, identification information of JSON data corresponding to content to be delivered; if there is address information corresponding to preloaded video data in a memory list corresponding to the identification information, reads the address information from the memory list, and reads the preloaded video data according to the address information, where the preloaded video data is for partially reading the content to be delivered; and if there is no address information corresponding to the preloaded video data in a memory list corresponding to the identification information, reads the address information from a target disk, and reads the preloaded video data according to the address information.

Those skilled in the art should appreciate that the present disclosure may be implemented in hardware embodiments, software embodiments, or a combination of software and hardware. Furthermore, the present disclosure may be implemented as a computer program product embodied on one or more computer-readable storage media (including but not limited to disk storage, optical storage and the like) having computer-readable program code embodied therein.

The present disclosure is described with reference to schematic flowchart illustrations and/or block diagrams of implementations of methods, devices (systems), and computer program products according to embodiments of the present disclosure. It should be understood that each process and/or block in the schematic flowchart illustrations and/or block diagrams, and combinations of processes and/or blocks in the schematic flowchart illustrations and/or block diagrams, may be implemented by computer program instructions. These computer program instructions may be provided to a processor of a general purpose computer, special purpose computer, embedded processor or other programmable data processing device to produce a machine, such that instructions executed by a processor of a computer or other programmable data processing device produce a device for implementing functions specified in one or more processes in the flowchart diagrams and/or one block or more blocks in the block diagrams.

The computer program instructions may be stored in a computer readable memory capable of directing a computer or other programmable data processing apparatus to function in a particular manner, such that the instructions stored in the computer readable memory result in an article of manufacture including the instruction means. The instruction means implements the functions specified in one or more processes in the flowchart diagrams and/or one block or more blocks in the block diagrams.

Alternatively, these computer program instructions are loaded onto a computer or other programmable data processing device such that a series of operational steps are performed on the computer or other programmable device to produce a computer-implemented process, so that instructions executed on a computer or other programmable device provide steps for implementing the functions specified in one or more processes in the flowchart diagrams and/or one block or more blocks in the block diagrams.

Merely preferred embodiments of the present disclosure are described above, and are not intended to limit the protection scope of the present disclosure.

What is claimed is:

1. A method for caching content, comprising:
   acquiring JavaScript (JS) object notation (JSON) data corresponding to content to be delivered, and determine identification information corresponding to the JSON data;
   grouping the JSON data and storing the grouped JSON data according to the identification information to obtain a memory list corresponding to the identification information, and writing the JSON data to a target disk according to the identification information and the memory list;
   performing video preloading processing on the content to be delivered according to the JSON data to obtain preloaded video data, and determining address information corresponding to the preloaded video data, wherein the preloaded video data is for partially caching video data for the content to be delivered; and
   storing the address information in the memory list and the target disk according to the identification information, to complete caching of the JSON data and the preloaded video data.

2. The method according to claim 1, wherein the grouping the JSON data and storing the grouped JSON data according to the identification information to obtain a memory list comprises:
   storing the JSON data with same identification information in a same list, and generating the memory list corresponding to the identification information, wherein the identification information is in one-to-one correspondence with the memory list.

3. The method according to claim 1, wherein the performing video preloading processing on the content to be delivered according to the JSON data to obtain preloaded video data comprises:
   preloading, based on the JSON data, part of all video data corresponding to the content to be delivered according to a preset data parameter, to obtain the preloaded video data.

4. The method according to claim 3, wherein after the storing the address information in the memory list and the target disk according to the identification information, the method further comprises:
   traversing the memory list, and performing the video preloading process on the JSON data in the memory list that does not store the address information, to obtain all the video data corresponding to the content to be delivered.

5. The method according to claim 3, wherein after the storing the address information in the memory list and the target disk according to the identification information, the method further comprises:
   traversing the memory list and deleting expired data in the memory list to obtain an updated memory list; and
   updating the target disk according to the updated memory list.

6. A first client computing device, comprising:
   at least one processor; and
   at least one memory communicatively coupled to the at least one processor and storing instructions that upon execution by the at least one processor cause the first client computing device to:
   acquire JavaScript Object Notation (JSON) data corresponding to content to be delivered;
   determine identification information corresponding to the JSON data;
   group the JSON data and store the grouped JSON data according to the identification information, to obtain a memory list corresponding to the identification information;
   write the JSON data to a target disk according to the identification information and the memory list;
   perform video preloading processing on the content to be delivered according to the JSON data to obtain preloaded video data, wherein the preloaded video data is for partially caching the video data for the content to be delivered;
   determine address information corresponding to the preloaded video data; and store the address information in the memory list and the target disk according to the identification information, to complete caching of the JSON data and the preloaded video data.

7. The first client computing device according to claim 6, the at least one memory communicatively coupled to the at least one processor and storing instructions that upon execution by the at least one processor cause the first client computing device to:
  store the JSON data with same identification information in a same list, and generate the memory list corresponding to the identification information, wherein the identification information is in one-to-one correspondence with the memory list; and
  preload, based on the JSON data and according to a preset data parameter, part of all video data corresponding to the content to be delivered to obtain the preloaded video data.

8. The first client computing device according to claim 7, the at least one memory communicatively coupled to the at least one processor and storing instructions that upon execution by the at least one processor cause the first client computing device to:
  traverse the memory list after the address information is stored in the memory list and the target disk according to the identification information, and perform the video preloading process on JSON data in the memory list that does not store the address information, to obtain all video data corresponding to the content to be delivered; and
  after the address information is stored in the memory list and the target disk according to the identification information, traverse the memory list and delete expired data in the memory list to obtain an updated memory list; and update the target disk according to the updated memory list.

9. A non-transitory computer readable storage medium on which a program is stored, wherein the non-transitory computer readable instructions, when executed by a computer, cause the computer to:
  acquire JavaScript Object Notation (JSON) data corresponding to content to be delivered, and determine identification information corresponding to the JSON data;
  group the JSON data and store the grouped JSON data according to the identification information, to obtain a memory list corresponding to the identification information, and write the JSON data to a target disk according to the identification information and the memory list;
  perform video preloading processing on the content to be delivered according to the JSON data to obtain preloaded video data, and determine address information corresponding to the preloaded video data, wherein the preloaded video data is for partially caching the video data for the content to be delivered; and
  store the address information in the memory list and the target disk according to the identification information, to complete caching of the JSON data and the preloaded video data.

* * * * *